(12) United States Patent
Liu et al.

(10) Patent No.: US 6,775,973 B2
(45) Date of Patent: Aug. 17, 2004

(54) CONTINUOUS FLOW, NOX-REDUCTION ADSORPTION UNIT FOR INTERNAL COMBUSTION ENGINES

(75) Inventors: Ke Liu, East Longmeadow, MA (US); Peter F. Foley, Manchester, CT (US); Eric A. Rohrbach, Lebanon, CT (US); Wayne G. Wnuck, South Windsor, CT (US)

(73) Assignee: HydrogenSource LLC, South Windsor, CT (US)

( * ) Notice: Subject to any disclaimer, the term of this patent is extended or adjusted under 35 U.S.C. 154(b) by 61 days.

(21) Appl. No.: 10/309,712

(22) Filed: Dec. 4, 2002

(65) Prior Publication Data

US 2004/0107697 A1 Jun. 10, 2004

(51) Int. Cl.[7] .................................. F01N 3/10
(52) U.S. Cl. ........................ 60/301; 60/286; 60/295
(58) Field of Search ........................ 60/286, 295, 301

(56) References Cited

U.S. PATENT DOCUMENTS

| | | | | |
|---|---|---|---|---|
| 2,946,651 A | * | 7/1960 | Houdry | 60/274 |
| 5,701,735 A | * | 12/1997 | Kawaguchi | 60/274 |
| 5,715,677 A | * | 2/1998 | Wallman et al. | 60/274 |
| 5,822,977 A | * | 10/1998 | Fukuda et al. | 60/274 |
| 5,974,791 A | * | 11/1999 | Hirota et al. | 60/276 |
| 6,029,444 A | * | 2/2000 | Nakamura et al. | 60/324 |
| 6,233,926 B1 | * | 5/2001 | Bailey et al. | 60/295 |
| 6,708,486 B2 | * | 3/2004 | Hirota et al. | 60/297 |

* cited by examiner

Primary Examiner—Diem Tran
(74) Attorney, Agent, or Firm—M. P. Williams

(57) ABSTRACT

Oxides of nitrogen are adsorbed onto the surfaces of gas passages (68) in a bed (57, 100) that has relative rotation with respect to a gas inlet distributor (76, 101). The manifold has a baffle (85) or ribs (121, 122) that causes constantly flowing engine exhaust (53) to enter the gas passages over a large portion of a revolution of the adsorption bed or the distributor, and causes constantly flowing regeneration gas (54) to thereafter pass through those passages during a small portion of each revolution. The passages may be formed by planar (66a) or helical (66b) radial walls (66), a serpentine wall (70), a monolith (126), or a honeycomb (127). Either the distributor (101) or the bed (57) may be rotated to distribute the gases.

13 Claims, 5 Drawing Sheets

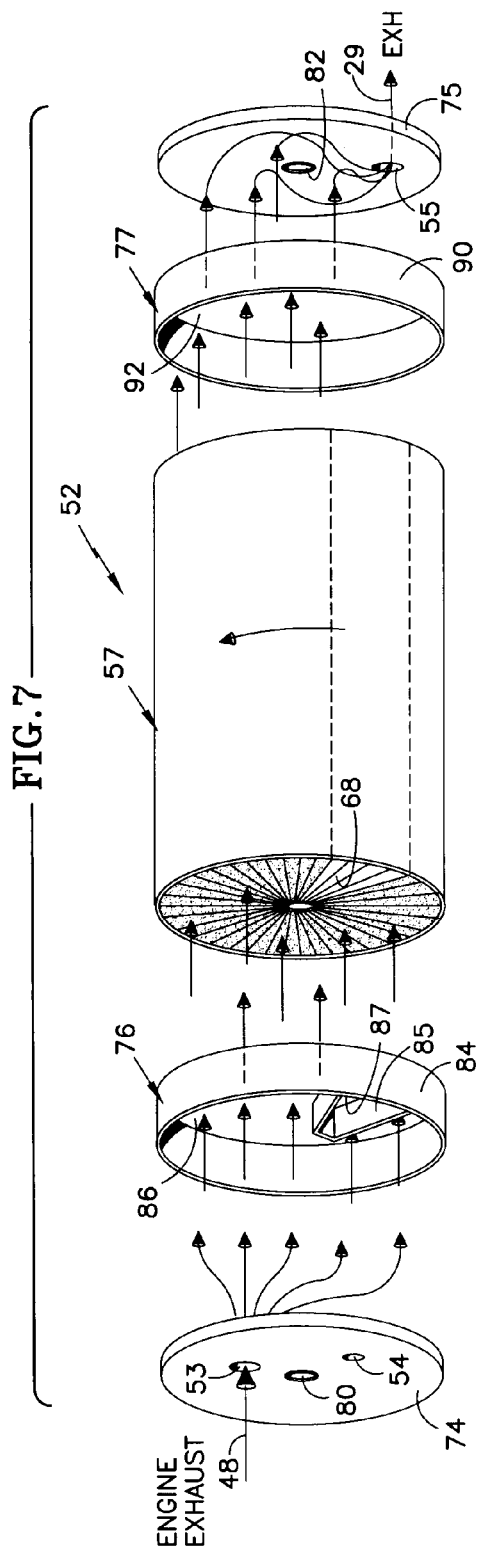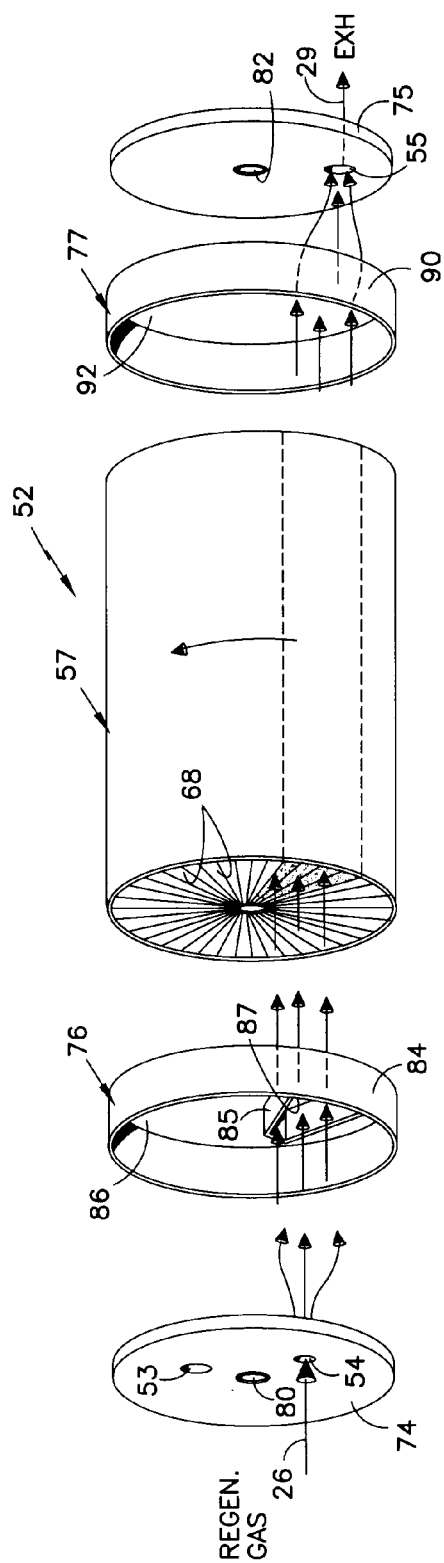

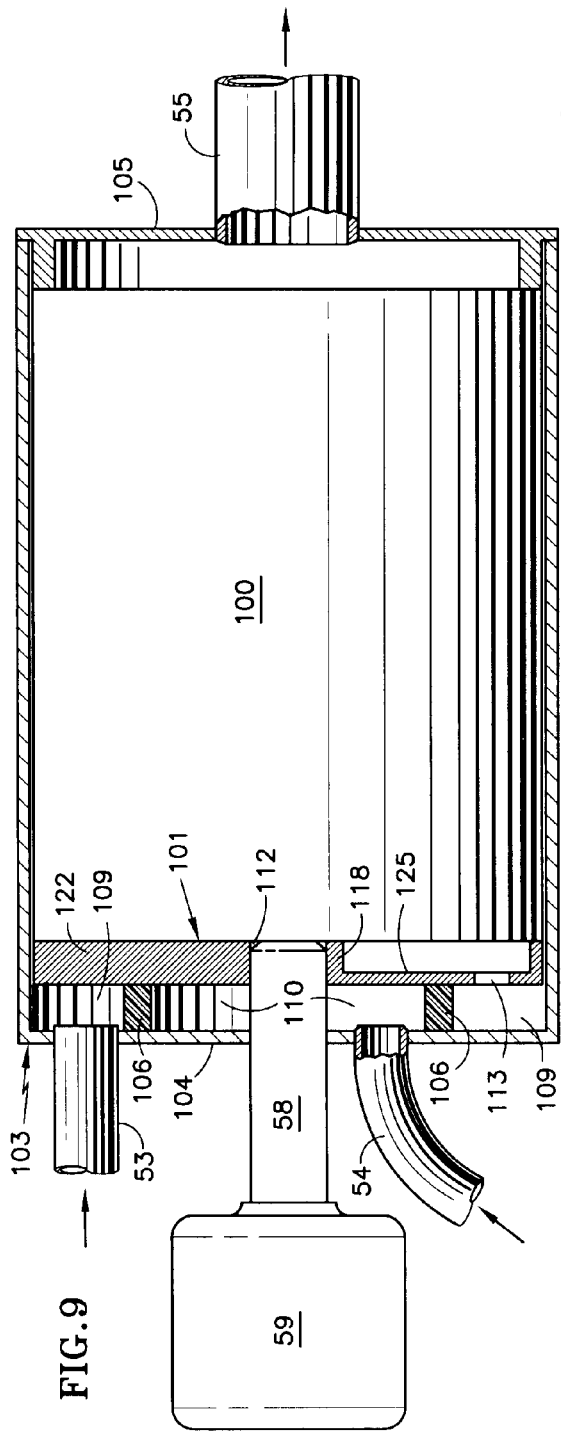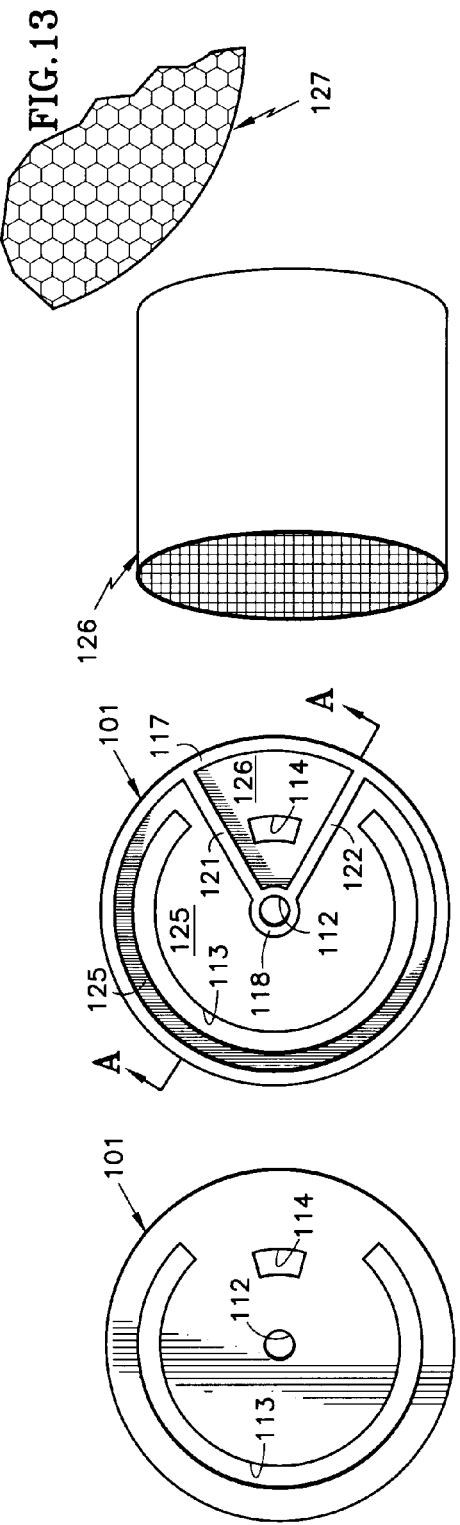

CONTINUOUS FLOW, NOX-REDUCTION ADSORPTION UNIT FOR INTERNAL COMBUSTION ENGINES

TECHNICAL FIELD

This invention relates to a NOx-reducing adsorption unit having an adsorption bed, in which the engine exhaust and the stream of regeneration gas, including hydrogen and carbon monoxide, both flow continuously, the adsorption bed and a gas inlet distributor having continuous relative rotation, portions of the adsorption bed being in fluid communication with engine exhaust inlet manifold for a first fraction of each cycle and then being in fluid communication with the regeneration gas for another fraction of each cycle, whereby successive portions of the filter first adsorb engine exhaust and then are regenerated, continuously.

BACKGROUND ART

The Environmental Protection Agency (EPA) has set, for 2007 and beyond, vehicle internal combustion engine emission requirements; one exemplary requirement for diesel engines, is NOx and non-methane hydrocarbons below 0.20 grams bhp-hr and 0.14 grams/bhp-hr, respectively. This contrasts with current standards of 4.0 grams/bhp-hr and 1.3 grams/bhp-hr, respectively. Thus, the catalytic converters must accomplish a significant reduction in NOx.

Apparatus that oxidizes engine fuel to provide a mix that enhances NOx reduction is disclosed in U.S. Pat. No. 5,412,946, in PCT published application WO 01/34950, and U.S. patent application Publication 2001/41153.

In commonly owned U.S. patent application Ser. No. 10/159,369, filed May 31, 2002, moisture and possibly oxygen, derived from the exhaust of a hydrocarbon-fueled, internal combustion engine are processed along with fuel from the engine's fuel tank in a fuel processor, which may be a catalytic partial oxidation reformer, a non-catalytic (homogeneous) partial oxidation reformer, or an auto thermal reformer, to generate a stream of hydrogen and carbon monoxide which is used to regenerate NOx traps following the formation of nitrogen-containing compounds by reaction of the exhaust with adsorbent in the NOx traps.

In FIG. 1, an engine 9 has a conventional turbo compressor 10 feeding an air inlet line 11, a hydrocarbon fuel tank 12, and a fuel pump 13. The fuel may be diesel fuel, gasoline, natural gas, liquid petroleum gas, or propane. The fuel is fed by a first line 17 to the engine for combustion with the air, and is fed by a second line 18 through a heat exchanger 50, to a mixer 19 in a pipe 20 that feeds a small amount of exhaust from an exhaust pipe 21 to a hydrogen generator 22.

The hydrogen generator 22 may be a catalytic partial oxidizer (CPOx), a non-catalytic (homogeneous) partial oxidizer, or an auto thermal reformer (ATR). Within the hydrogen generator, if it is a CPOx, foam monolith or other form of catalyst, which may comprise a group VIII metal, preferably nickel, cobalt, rhodium, iridium or platinum, convert fuel along with hydrocarbons, water and oxygen into a mix of hydrogen, CO and $CO_2$, which is regeneration gas, commonly called "syngas". This is provided through a conduit 26 to a pair of NOx adsorbent traps 35, 36 which are alternatively connected by corresponding valves 40–43 to either the conduit 26 with hydrogen-containing gas from the generator 22, or to a pipe 48 containing engine exhaust.

The valves are controlled so that engine exhaust is allowed to flow in one of the traps 35, 36 for a period of time which is less than the time necessary to saturate it with NOx, and then the valves are switched so that exhaust flows in the other NOx trap, while the first NOx trap is regenerated by the hydrogen and carbon monoxide from the generator 22. In one regeneration cycle, the valves 41 and 42 will be closed and the valves 40, 43 will be open so that engine exhaust is adsorbed in the trap 35, and the trap 36 is regenerated; in the next regeneration cycle, valves 40 and 43 will be closed and the valves 41 and 42 will be open so that engine exhaust is adsorbed in the trap 36, and the trap 35 is regenerated, and so forth.

Although various adsorbents may be used, the NOx traps may, for example, contain barium carbonate ($BaCO_3$) as the adsorbent. Typically, a catalyst, such as platinum, may be wash-coated on the adsorbent material to catalyze the reaction. When the diesel exhaust is adsorbed by the barium carbonate, a reaction generates barium nitrate.

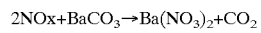

Then, during the regeneration cycle, the barium nitrate is converted back to barium carbonate, as follows:

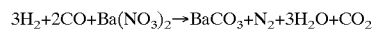

The heat exchanger 50 causes heat of the engine exhaust to vaporize the fuel in the line 18 before applying it to the hydrogen generator, which is particularly useful in the case of a CPOx reformer being used as the hydrogen generator.

A CPOx reformer is preferred in one sense because it is very small and can run with low steam carbon ratios and high turndown ratios without soot or carbon formation. However, diesel engine exhaust contains particulates (soot) and oxides of sulfur (SOx), which may deactivate the CPOx catalyst over a period of time. Therefore, a non-catalytic (homogeneous) partial oxidizer may alternatively be selected as the hydrogen generator 22. The percentage of hydrogen produced is only slightly less than that produced by a CPOx. It is easily started by employing a simple spark plug, as is known. Additionally, POX is cheaper than CPOx; control of the $O_2/C$ ratio is known (similar to engine $O_2$/fuel ratio), and simpler; SOx and soot do not affect it; and there is no steam/C ratio problem.

However, the alternating adsorption and regeneration cycles require large, high temperature valves for the engine exhaust. Switching of the exhaust from one adsorption bed to the other, at high exhaust temperature, is a difficult operation.

Furthermore, the engine exhaust valves leak: typically on the order of 5% of the total engine exhaust will flow through the wrong adsorption bed during regeneration thereof. Because there may be up to 15% oxygen in the engine exhaust, which oxygen will react with the hydrogen and carbon monoxide in the regeneration gas, a significant amount of regeneration gas is consumed (wasted) by being combined with oxygen due to the leaks in the valves. The reaction of $O_2$ with $H_2$ and CO will cause a rise in temperature which could deactivate the NOx adsorption bed catalyst.

DISCLOSURE OF INVENTION

Objects of the invention include: eliminating high temperature valves in regenerating adsorption beds; improvement in the reduction of NOx to nitrogen and other harmless gases in internal combustion engine exhaust; providing a continuous process for regenerating NOx adsorbents; reducing the size and complexity of NOx-reducing equipment for engine exhaust; simplified equipment for meeting EPA 2007

NOx emission requirements; and avoiding waste of regeneration gas that occurs due to valve leakage in alternating NOx-adsorption systems.

This invention is predicated in part on the discovery that the amount of time that it takes to regenerate an NOx adsorption bed when exposed to regeneration gas is much less than the amount of time that the same size of adsorption bed may take to become saturated with NOx, when in the flow of engine exhaust.

According to the present invention, a relatively rotating inlet gas distributor and NOx adsorption bed having a plurality of flow paths lined with adsorption catalyst, causes a flow of internal combustion engine exhaust in each path during a first fraction of a revolution, and a flow of regeneration gas in each path during the remainder of a revolution. The exhaust gas and regeneration gas are both flowed continuously through the bed.

According to the invention, the flow of gases into the bed is controlled by a distributor having a baffle therein to keep the exhaust gas and regeneration gas separate, and to determine which paths receive one or the other of the gas flows at any point in time. Either the bed (in one embodiment) or the distributor (in another embodiment) may be rotated to cause the gas flows to alternate in the flow paths.

According to the invention in one form, the fraction of each revolution of the bed or distributor devoted to adsorption of NOx is much greater (on the order of between two and forty to one) than the fraction of each revolution required for regenerating of the adsorbent.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 7 is a simplified, schematized, exploded, perspective view of a continuous flow regeneratable adsorption filter apparatus according to the present invention, illustrating the flow path of the engine exhaust.

FIG. 8 is a simplified, schematized, exploded perspective view of a continuous flow regeneratable adsorption bed apparatus according to the present invention, illustrating the flow path of the regeneration.

FIG. 9 is a simplified, stylized, partially sectioned side elevation schematic of an alternative embodiment of the present invention in which the inlet gas distributor rotates.

FIG. 10 is a top plan view of the rotating inlet gas distributor of FIG. 9.

FIG. 11 is a bottom plan view of the rotating distributor of FIG. 9; the view of the distributor in FIG. 9 is taken on the line A—A of FIG. 11.

FIG. 12 is a simplified perspective view of a monolith adsorption bed.

FIG. 13 is a fractional end elevation view of a honeycomb adsorption bed.

MODE(S) FOR CARRYING OUT THE INVENTION

Figure 2:
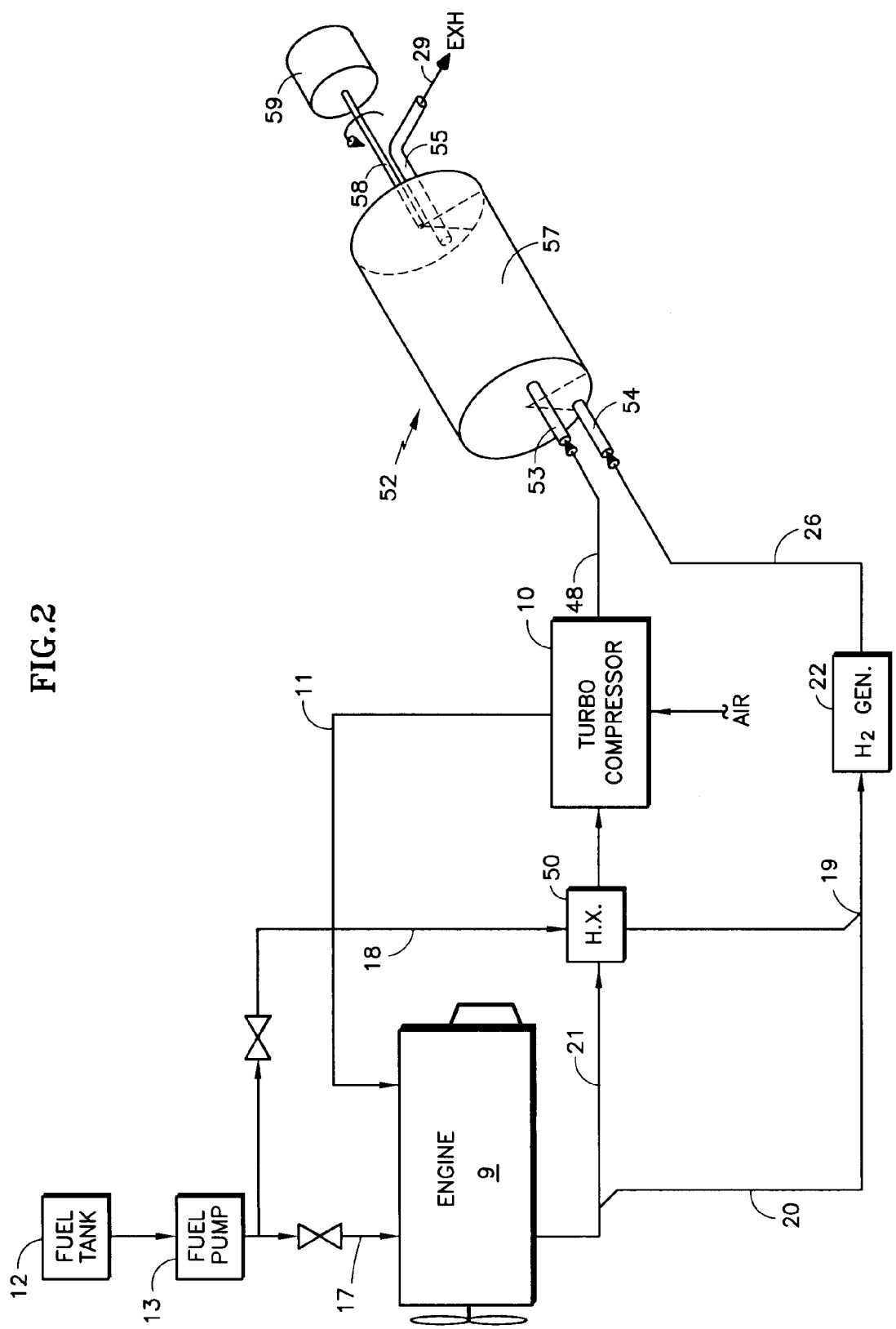
FIG. 2 is a simplified, stylized schematic illustration of an engine incorporating an exemplary embodiment of the present invention in which the adsorption bed rotates.

Referring to FIG. 2, a continuously operable regenerating NOx adsorption bed apparatus 52 according to the present invention has an engine exhaust inlet port 53 which receives engine exhaust from a pipe 48, and a regeneration gas inlet port 54 which receives regeneration gas over a line 26. The apparatus 52 has an engine exhaust outlet port 55 connected to the exhaust line 29. Within the apparatus 52 is a rotating adsorption bed 57 that is illustrated in FIGS. 3–8. The filter assembly 52 may have a shaft 58 driven by a motor 59 for rotating the bed 57 that is described more fully hereinafter. The bed may be rotated very slowly, such as between one-half RPM and five RPM.

Figure 1:
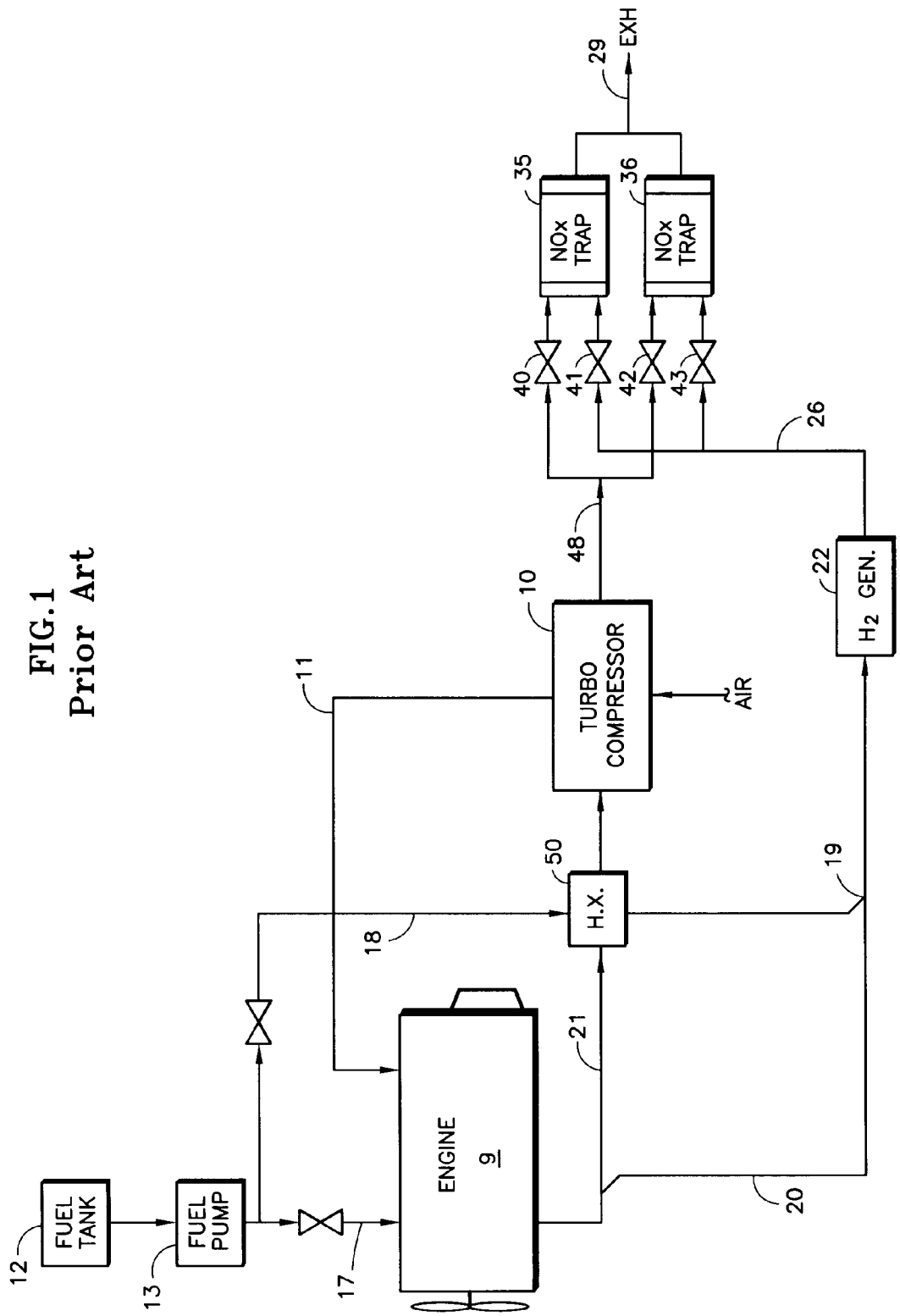
FIG. 1 is a simplified, stylized schematic illustration of an engine incorporating alternating NOx traps known to the prior art.
Figure 3:
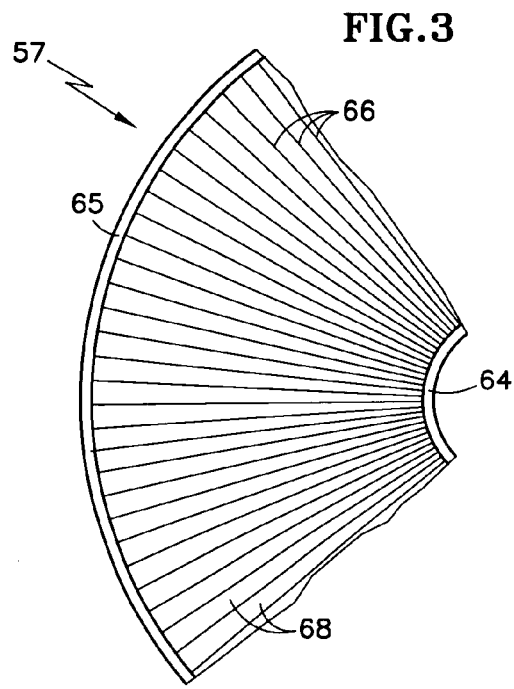
FIGS. 3 and 4 are partial end elevation views of different embodiments of adsorption beds for use in the present invention.
Figure 5:
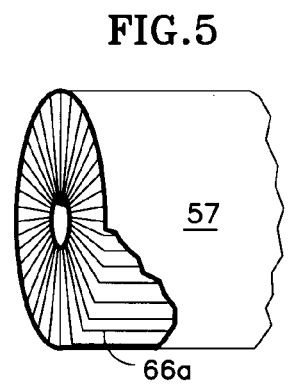
FIGS. 5 and 6 are simplified, partial, partially broken away perspective view of planar and helical filters, respectively.
Figure 6:
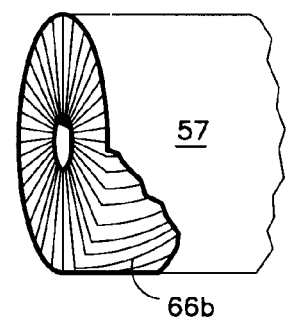

In FIG. 3, the bed 57 may comprise a cylinder (FIGS. 5 and 6) having an inner cylindrical wall 64, an outer cylindrical wall 65, and a plurality of radial walls 66 which together form flow paths 68. The walls 66a (FIG. 5) may be planar forming flow paths 68, which are substantially sectorial in shape. Or, the walls 68b may be helical, as shown in FIG. 6. Each side of each radial wall is covered with the adsorbent, as may be the inner, exposed surfaces of the cylindrical walls 64, 65. Flow of exhaust through the sectors 68 will cause the various oxides of nitrogen to be adsorbed onto the surfaces of the radial walls 66, and walls 64, 65 if coated with adsorbent. Thereafter, when the same sectors have regeneration gas flowing through them, the regeneration process described hereinbefore with respect to FIG. 1 will take place, thus enabling those sectors to once again adsorb NOx from exhaust gas flowing therethrough.

Figure 4:
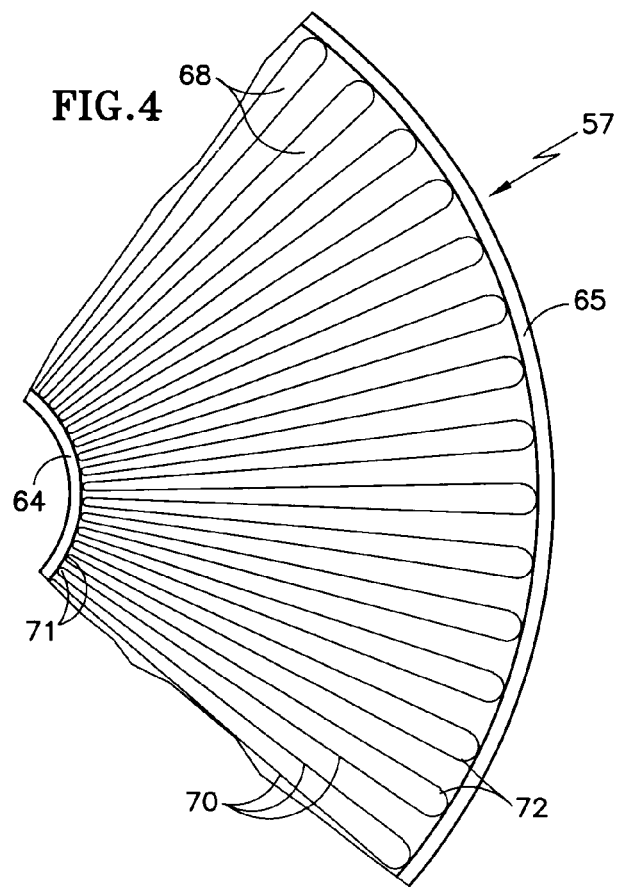

As shown in FIG. 4, instead of radial walls 66, the interior surface of the filter 62 may comprise a single wall 70 of a serpentine shape, both sides of which are coated with adsorption material. In FIG. 4, the gas flow paths are formed from a single layered sheet comprising the NOx adsorbing material and a support material, the sheet being formed into a serpentine pattern having a plurality of radially inward bights 71 and a plurality of radially outward bights 72, a first side of each of said radially inward bights 71 being connected by radially disposed portions of the sheet to a second side of the radially outward bights 72, and a first side of each of the radially outward bights 72 being connected by radially disposed portions of said sheet to a second side of each of the radially inward bights 71. In either case, the walls 66 or the wall 70 should extend from the inner cylindrical wall 64 to the outer cylindrical wall 65 so as to prevent mixing of the exhaust gas with the recycle gas; stated alternatively, to avoid leakage and the commensurate wasting of recycle gas, which occurs in the prior art alternating trap design as described hereinbefore.

Referring to FIG. 7, the filter apparatus 52 includes an inlet end cap 74, an outlet cap 75, a stationary inlet gas distributor 76 and an outlet manifold 77. The inlet cap 74 has holes comprising part of the exhaust and regeneration gas inlet ports 53, 54 (FIG. 2) and a bearing 80 to journal the shaft 58. The outlet cap 75 has a hole comprising part of the exhaust gas outlet port 55 (FIG. 2) and a bearing 82 for journaling the shaft 58. The inlet gas distributor 76 comprises a cylindrical outer wall 84, and a baffle 85 defining two chambers 86, 87 that determine the flow path of the two inlet gases.

The outlet manifold 77 has a cylindrical outer wall 90 defining a chamber 92. The engine exhaust and the spent regeneration gas are both flowed to the same exhaust 29 through the exhaust port 55.

In FIG. 7, the flow path of the engine exhaust is illustrated as being through the exhaust inlet port 53, through the chamber 86 and thence through all of the segments which have been blackened in FIG. 7, through the chamber 92, and thence through the exhaust outlet port 55 to the exhaust pipe 29.

In FIG. 8, the regeneration gas flows through the regeneration gas inlet port 54, through the chamber 87 and all those sectors 68 which are blackened in FIG. 8, through the chamber 92, and through the exhaust gas outlet port 55 to the exhaust pipe 29.

The regeneration gas may flow into gas paths 68 extending across about 40° (11%) in FIG. 8. In the general case however, the regeneration gas may flow into between 18° (5%) and 180° (50%) of the gas paths at any one time.

It should be borne in mind that the engine exhaust and the recycle gas are both flowing simultaneously, all of the time. The flows are shown separately in FIGS. 7 and 8 simply to clarify the nature of the invention.

It may be preferable, in some embodiments, to have the inlet to any flow path in the adsorption bed radial, so that there is a quick transition from flowing one of the gases (such as exhaust) to flowing the other of the gases (such as regeneration gas), thereby to achieve a small interface between exhaust gas and recycle gas, as the gas flow changes in any flow path. However, in some embodiments the flow path demarcations may not necessarily need to be radial, each particular flow path changing from one gas to another in a radially sweeping manner.

Instead of utilizing a stationary inlet gas distributor 76 and a rotating adsorption bed 57, the invention may be practiced as illustrated in FIGS. 9–11 utilizing a stationary adsorption bed 100 and a rotating inlet gas distributor 101. The bed 100 and distributor 101 are within a cylindrical container 103 which is closed at the inlet end 104 thereof, and which has a cap 105 at the outlet end thereof to permit installation and retention of the bed 100. The cap 105 may be secured to the container 103 in any known fashion. A cylindrical divider and seal 106 divides the space between the end 104 and the distributor 101 into two annular channels 109, 110, which comprise portions of the respective gas inlets, with the respective gas inlet ports 53, 54. The exhaust gas entering through the exhaust gas inlet port 53 will flow throughout the channel 109, and the regeneration gas entering through the regeneration gas inlet port 54 will flow throughout the channel 110.

Referring to FIG. 10, the distributor 101 has a central hole 112 into which the motor shaft 58 is rigidly attached. A circular slot 113 allows gas to pass from the outer channel 109 into the stationary bed 100 during a very large fraction of a revolution of the distributor 101, such as on the order of between 180° and 355° of each revolution. A slot 114 allows regeneration gas to flow into the stationary bed 100 during a small fraction of a revolution of the distributor 101, such as on the order of between 90° and 180°. In this embodiment, except for the holes 112–114, the inlet surface of the distributor 101, shown in FIG. 10, is flat.

The outlet side of the distributor 101, shown in FIGS. 9 and 11, includes a circumferential rib 117, a hub rib 118, and a pair of radial ribs 121, 122. The radial ribs 121, 122 separate the two gases in the same fashion as does the baffle 85, in the embodiments of FIGS. 3–8. Exhaust gas entering the channel 109 will pass through the slot 113 into a chamber 125 (FIG. 9) which extends within the greater portion of the circumferential rib 117 on the side of the radial ribs 121, 122 on which the slot 113 is formed.

Similarly, the surfaces of the radial ribs 121, 122 which are adjacent the slot 114 will form with the circumferential rib 117, a chamber 126 into which regeneration gas will flow through the slot 114 from the annular channel 110 (FIGS. 9 and 10).

As the distributor 101 rotates, the radial ribs 121, 122 divert one or the other of the gases into incrementally different portions of the stationary adsorption bed 100. The effect is the same in the embodiment of FIGS. 9–11 as it is in the embodiment of FIGS. 3–8.

The rotating bed 57 and stationary bed 100 may be comprised of a monolith 126 (FIG. 12), which typically consists of a large number of channels that extend from one end of a cylinder to the other, the channels usually being square; the beds may comprise a hexagonal honeycomb 127 (FIG. 13). The surface of all of the channels will be coated with a suitable adsorption material and a catalyst, such as that described hereinbefore. Any other form of suitable bed may be used, for either of the embodiments.

Although not shown in FIG. 2, the invention may be used with gas recirculation to the engine, which may take the form of exhaust gas recirculation (commonly called "EGR"), or regeneration gas recirculation which could be effected by passing a fraction of the recirculation gas in the conduit 26 to the air inlet line 11. The use of gas recirculation may provide improved overall NOx reduction, as is known and described in the prior art. However, the invention neither requires nor precludes the use of EGR.

All of the aforementioned patents and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A continuous flow NOx reduction apparatus, comprising:

an NOx adsorption bed having an outer wall and a plurality of gas flow paths that extend from an entry end of said bed to an exit end of said bed, each of said gas flow paths having surfaces coated with NOx adsorbent material, a gas inlet of each of said gas flow paths being in a plane at said entry end with gas inlets of all other ones of said gas flow paths;

a gas inlet distributor having two chambers adjacent said plane at said entry end of said bed to direct gas in one of said chambers into ones of said flow paths adjacent said one chamber, and to direct gas in another of said chambers into ones of said flow paths adjacent said other chamber;

an engine exhaust gas inlet disposed to admit engine exhaust gas into a first one of said chambers;

a regeneration gas inlet disposed to admit adsorbent regeneration gas into a second one of said chambers; and means for providing relative rotation between said bed and said distributor.

2. An apparatus according to claim 1 wherein said bed element comprises:

a plurality of walls forming said gas flow paths, the walls of said gas flow paths coated with NOx adsorbing material.

3. An apparatus according to claim 2 wherein said NOx adsorbing material is $BaCO_3$.

4. An apparatus according to claim 2 wherein:
said outer wall is cylindrical; and
said walls are radial and extend inwardly from said outer wall.

5. An apparatus according to claim 4 wherein:
said radial walls are planar.

6. An apparatus according to claim 4 wherein:
said radial walls are helical.

7. An apparatus according to claim 1 wherein:
said outer wall is cylindrical with an axis; and
said gas flow paths are formed from a single layered sheet comprising the NOx adsorbing material and a support material, said sheet being formed into a serpentine pattern having a plurality of radially inward bights and a plurality of radially outward bights, a first side of each of said radially inward bights being connected by radially disposed portions of said sheet to a second side of said radially outward bights, and a first side of each of said radially outward bights being connected by radially disposed portions of said sheet to a second side of each of said radially inward bights, to establish said flow in a flow direction parallel to said axis and between adjacent radial portions of said sheet.

8. An apparatus according to claim 7 wherein:
said radial portions of said sheet are planar.

9. An apparatus according to claim 7 wherein:
said radial portions of said sheet are helical.

10. An apparatus according to claim 1 wherein said filter element comprises either (a) or (b) a honeycomb having a plurality of passages forming said flow paths.

11. An apparatus according to claim 1 wherein:
said distributor is stationary; and
said means comprises means for rotating said bed.

12. An apparatus according to claim 1 wherein:
said bed is stationary; and
said means comprises means for rotating said distributor.

13. An apparatus according to claim 12 wherein:
said gas inlets comprise annular channels receiving respective gas from corresponding gas inlet ports.

* * * * *